June 30, 1931. G. M. BELLANCA Re. 18,115

EXHAUST MANIFOLD

Original Filed Sept. 16, 1926 2 Sheets-Sheet 1

Inventor

Guiseppe Mario Bellanca

By Semmes + Semmes

Attorneys

June 30, 1931. G. M. BELLANCA Re. 18,115

EXHAUST MANIFOLD

Original Filed Sept. 16, 1926 2 Sheets-Sheet 2

Inventor

Giuseppe Mario Bellanca

By Sommer & Sommer

Attorneys

Reissued June 30, 1931

Re. 18,115

UNITED STATES PATENT OFFICE

GUISEPPE M. BELLANCA, OF NEW CASTLE, DELAWARE, ASSIGNOR TO BELLANCA AIRCRAFT CORPORATION, OF NEW CASTLE, DELAWARE, A CORPORATION OF DELAWARE

EXHAUST MANIFOLD

Original No. 1,713,814, dated May 21, 1929, Serial No. 135,770, filed September 16, 1926. Application for reissue filed March 27, 1930. Serial No. 439,520.

This invention relates to the construction and mounting of an exhaust manifold for aeronautical engines.

In the development of airplanes in connection with which engines of the radial and other more or less similar types are used, considerable difficulty has been found in so mounting the exhaust manifold that it will not present a substantial surface area to produce air resistance and a corresponding restriction in speed of flight of the airplane. This difficulty arises out of the necessity for mounting the exhaust manifold outside the chamber formed by the shell of the fuselage and in a disposition substantially encircling the cowl portion of the fuselage transversely to the direction of flight. The manifold by thus extending across the line of flight, presents its forward surface throughout its length to the resistance of the air.

A general object of the present invention is to provide an exhaust manifold for radial aeronautical engines which will be free from the objectionable features referred to and which will provide a minimum amount of air resistance.

Further objects of the invention are to minimize the effects of the noise produced by the discharging exhaust, to prevent overheating of the manifold, and to prevent buckling or distortion of the parts under expansion effects arising out of temperature changes.

The invention includes the mounting of the exhaust manifold in a recess or channel formed in the surface of the engine cowling, the manifold being thereby partly or wholly protected from engagement of the rushing air therewith.

Another feature of the invention is the mounting of the manifold in a spaced apart relation to the surface of the receiving channel so that air can flow through the space between the manifold and channel surface to produce a cooling effect on the manifold and prevent overheating thereof.

Another feature of the invention is that the manifold is allowed to project slightly outside of the surface of the cowling so as to intercept a part of the air current and direct it through the space between the manifold and the channel surface.

Another feature of the invention resides in the provision of an exhaust manifold having a formation in cross-section such as will provide a minimum air-resistance area.

Another feature of the invention resides in the use of flexible joints in the manifold structure to prevent injury to the parts by expansion and contraction effects.

Still another feature of the invention resides in an adaptability of the manifold structure to be mounted in various positions to cause the exhaust to be discharged at any desired point in the length of the manifold structure.

Other features of the invention will be hereinafter referred to.

In the drawings, in which a preferred embodiment of the invention has been selected for illustration, Figure 1 is a diagrammatic view showing a portion of the forward end of an airplane equipped with an exhaust manifold construction embodying the invention.

Figure 1:
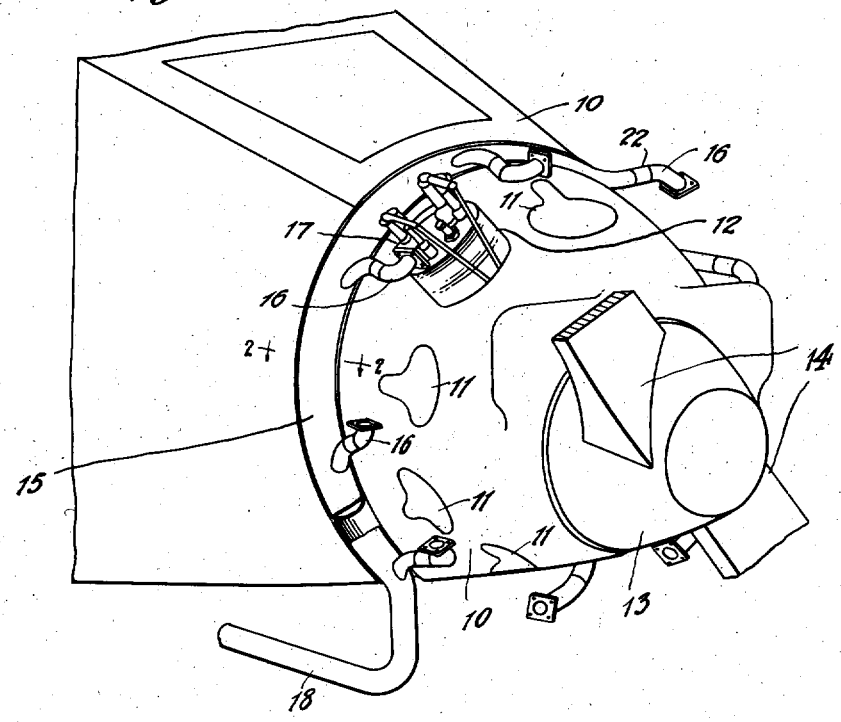

Referring to the drawings for a more detailed description of the invention, at 10 is shown the engine cowling portion of the fuselage of an airplane through openings 11 in which the cylinders 12 of an engine of the radial type protrude. The forward portion of the cowling 10 is equipped with a cap member or fairing 13 designed to decrease the effect of air resistance acting on the hub portions of the propeller 14.

In order to dispose of the exhaust from the radially disposed cylinders 12 through a common discharge conduit an exhaust manifold 15 is made use of which is disposed in a substantially encircling relation to the cowl structure 10, the location of the manifold being just to the rear of the positions of the engine cylinders 12. Branch pipe connections 16 are provided between the exhaust discharge ports 17 of the engine cylinders 12 and the manifold 15, the manifold terminating in a discharge member 18 which is directed rearwardly and may be extended for any desired distance along an outer wall of the fuselage.

In order to cause the manifold to present a minimum area of surface to prevent air resistance the manifold is mounted in a recess or groove 19 formed in the outer surface of the engine cowling 10. The groove or recess 19 extends circumferentially around the entire surface of the cowl and this disposition of the groove provides for the mounting of the manifold 15 in any desired angular relation to the cowl so as to cause the discharge member 18 to be located at the most convenient point. In Figure 1 of the drawings the discharge member 18 of the manifold is shown disposed beneath the floor wall of the fuselage, this location of the discharge terminal being useful in overcoming the effect of noises produced by the exhaust on the occupants of the compartments in the fuselage. It will be clear that the manifold 15 may be rotatably adjusted within the groove 19 to cause the terminal discharging member 18 to be disposed along either side of the fuselage or at a point to discharge above the fuselage and the supporting wing or plane.

Figure 2:
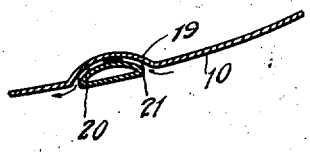
Figure 2 is a sectional view on an enlarged scale taken on the line 2—2 of Figure 1.
Figure 3:
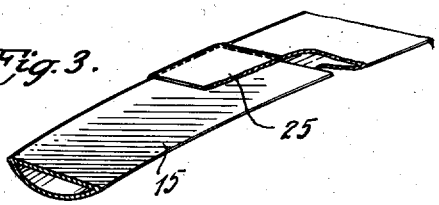
Figure 3 is a detail view in perspective showing the telescoping joint used in my improved manifold.

In order to prevent overheating of the manifold and the communication of heat to the adjacent surface of the cowl 10, the manifold is so mounted as to be slightly spaced apart from the adjacent surface of the groove or recess 19 as is clearly shown in Figures 1 and 2 of the drawings. The space 20 which is thus formed provides a passageway through which air can flow, as is indicated by the arrows in Figure 2 of the drawings, to thereby dissipate heat and prevent overheating of the adjacent parts. In order to facilitate the rush of air through the passageway 20 formed between the manifold 15 and the surface of the groove 19 the forward or leading edge 21 of the manifold is caused to protrude slightly beyond the adjacent outer surface of the cowl 10 to thereby function to provide a scooping action on the air stream rushing rearwardly along the surface of the cowl 10. The air thus caught or entrapped is diverted through the channel 20 as will be seen and produces the cooling effect referred to.

It will also be noted that the cross-section or formation of the manifold member 15 is such as to present a minimum degree of resistance to the air. In the drawings it will be noted that the manifold has the formation of a flattened tube with forwardly and rearwardly extending angles and a substantially flat outer surface following approximately the contour of the outer surface of the cowl 10. While this particular formation has been found effective in practice it will be apparent that other formations of the manifold cross-section may be employed with useful results.

Figure 4:
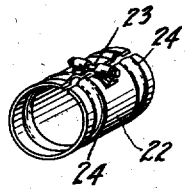
Figure 4 is a detail view in perspective showing the flexible joint used in the branches of my improved manifold.

Another feature of the invention resides in the use of flexible or yielding coupling elements in the body structure of the manifold member and also in the branch pipes 16 through which connections are made between the manifold and the engine cylinders 12. Coupling members or joints 22 are provided in the branch pipe connections 16 for this purpose. These coupling members may take the form of split sleeves an example of which is shown in Figure 4 of the drawings, the sleeve being provided with a clamping bolt 23 and having suitable corrugations 24 to prevent slipping of the coupling member from engagement with the joint sections of the branch exhaust pipes 16.

In order to provide for expansion or contraction of the manifold structure itself under changing temperature conditions a telescopic joint 25 is provided which permits of relative movement of the contiguous sections of the manifold toward or from each other to thereby prevent distortion or other injury to the manifold by the expansion and contraction effects due to changes in temperature.

In certain types of construction it is possible that the addition of the exhaust manifold of my invention may interfere with the application and removal of the material of the cowl structure. To obviate this difficulty the construction indicated in Figure 6 may be used. In this embodiment the cowl 10 of Figures 1 and 2 may be cut into portions. For instance, a nose portion 26 may be provided, cooperating with a recess portion 27, in the recess of which the exhaust manifold 21 may be positioned. The manifold may be spaced away from the member 27 by a small distance as before to provide the passageway 20 for cooling air. This construction permits the ready removal of the nose portion of the cowl for access to the engine members, or of the rear portion, or of the manifold and grooved portion together.

Figure 6:
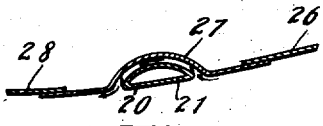
Figure 6 is a sectional view of a modification of Figure 2.
Figure 5:
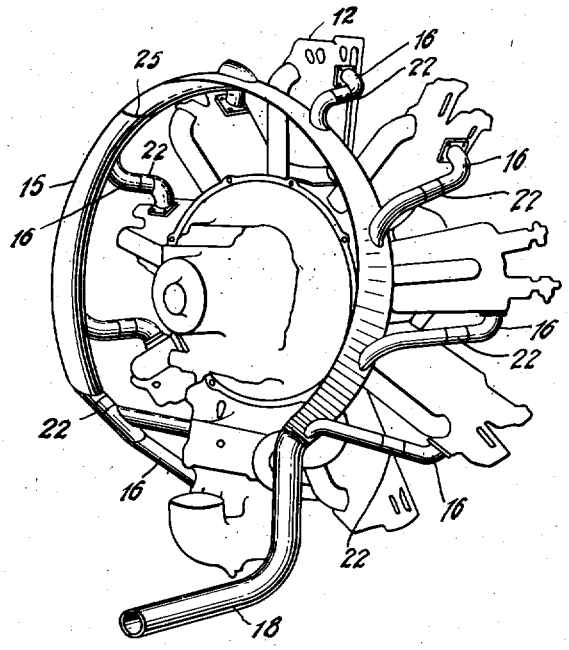
Figure 5 is a view in perspective showing the manifold structure detached from the engine cowling and presenting a rearward view thereof.

As a further modification the cowl member may be separated at two points as shown in Figure 6 to provide a nose portion 26, a channel portion 27 and a rear portion 28. This construction permits the removal of the nose portion and the rear portion of the cowl independently of the exhaust manifold and of the recess portion. This modification of the construction provides means for a more convenient and easy access to the engine structures.

It will be seen that a manifold structure and a method of mounting the same have been provided which overcomes or obviates the air resistance effects which are ordinarily encountered in the use of a manifold structure which must be disposed transversely to the line of flight of the airplane on which it is carried.

The language and expressions which have been employed throughout the specification are used as terms of description only and not of limitation, and such terms are intended to include all the equivalents and such modifications as are possible to be employed within the scope of the invention claimed.

I claim:

1. In an exhaust manifold construction for aeronautical engines of the radial type, a cowl through which the exhaust discharging ends of the radially disposed cylinders project, said cowl being provided with a circumscribing groove in its outer surface adjacent the engine cylinders, an exhaust manifold mounted in said groove and adjustable circumferentially therein, and a discharge terminal on the exhaust manifold.

2. In an exhaust manifold construction for aeronautical engines of the radial type, a cowl through which the exhaust discharging ends of the radially disposed cylinders project, an exhaust manifold for said cylinders mounted in circumscribing relation to the cowl, and said manifold being formed with flattened cross-section with its edges arranged fore and aft to present a minimum degree of air resistance.

3. In an exhaust manifold construction for aeronautical engines of the radial type, a cowl through which the exhaust discharging ends of the radially disposed cylinders of the engine project, an exhaust manifold for said cylinders mounted in circumscribing relation to the cowl, branch pipe connections between the cylinders and the manifold, and flexible joint sections contained in said branch pipe connections.

4. In an exhaust manifold construction for aeronautical engines of the radial type, an exhaust manifold for the engine cylinders mounted in an encircling disposition with relation to the longitudinal axis of the airplane, said manifold being circumferentially adjustable to vary the position of the discharge terminal, a yielding joint connection in said manifold whereby to provide for expansion and contraction effects, and said manifold having a flattened cross-sectional formation designed to present a minimum of air resistance.

5. In an exhaust manifold construction for aeronautical engines of the radial type, a cowl through which the exhaust discharging ends of the radially disposed cylinders project, said cowl being provided with a circumscribing groove in its outer surface adjacent the engine cylinders, an exhaust manifold mounted in said groove, said manifold being circumferentially adjustable in said groove and spaced from the walls of the groove to permit a current of air to pass therethrough, a flexible joint in said manifold, branch pipe connections between said cylinders and said manifold, and flexible joint sections in said branch connections.

6. In an exhaust manifold construction for aeronautical engines, a cowl for the engine provided with a circumferential groove in its outer surface, an exhaust manifold mounted in and extending along said groove, said manifold having its underside formed in complement to the formation of the surface of the groove but spaced therefrom, the outer surface of the manifold being substantially flat and conforming approximately to the formation of the cowl surface, and the forward edge of the manifold protruding slightly beyond the contour of the cowl surface whereby to deflect air through the space between the manifold and the surface of the groove.

7. In an exhaust manifold construction for aeronautical engines of the radial type, a cowl through which the exhaust discharging ends of the radially disposed cylinders project, said cowl being provided with a circumscribing groove in its outer surface adjacent the engine cylinders, said cowl comprising separable portions, whereby a part thereof may be removed independently of said exhaust members, an exhaust manifold mounted in said groove, said manifold being circumferentially adjustable in said groove and spaced from the walls of the groove to permit a current of air to pass therethrough, a flexible joint in said manifold, branch pipe connections between said cylinders and said manifold, and flexible joint sections in said branch connections.

8. In an exhaust manifold construction for aeronautical engines of the radial type, a cowl through which the exhaust discharge end of the radially disposed cylinders project, an exhaust manifold for said cylinders mounted in circumscribing relation to the cowl, said manifold being flattened in cross section with its longer dimension extending fore and aft and substantially flush with the cowling.

9. In an airplane, a cowl for covering the forward portion of the airplane, said cowl being formed to receive a manifold having the outer surface substantially flush therewith and comprising separable portions whereby a part thereof may be removed independently of the other part without dismounting of the manifold.

10. In an airplane, a cowl for covering the forward portion of the airplane, said cowl being provided with a circumferential groove in its outer surface, and an exhaust manifold nested within said groove and being so formed that its outer surface forms substantially a continuation of the outer surface of the cowl.

11. In an airplane, a cowl for covering the forward portion of the airplane, said cowl being provided with a circumferential groove in its outer surface, and an exhaust manifold nested within said groove and being so formed that its outer surface forms substantially a continuation of the outer surface of the cowl and its leading edge projects slightly outside the surface of the cowl.

12. A circular exhaust manifold for radial and similar engines, said manifold having a flattened cross section, the shortest dimension of its cross section being radial, adapted to fit in a cowling groove with the outer surface substantially flush with the surface thereof.

13. An exhaust manifold having the outer surface thereof substantially flush with, and forming a substantial continuation of an airplane cowling, the manifold being positioned with respect to the cowling to direct air over the entire surface of the manifold.

14. In an airplane, a cowl covering the forward portion thereof, said cowl being provided with a circumferential depression in its outer surface, and an exhaust manifold nested within said depression and being so formed that its outer surface forms substantially a continuation of the outer surface of the cowl.

15. An exhaust manifold having the outer surface thereof flattened and substantially flush with and forming a substantial continuation of an airplane cowling, the manifold having a single exhaust outlet, and being so positioned with respect to the cowling as to allow for the direction of a current of air over substantially the entire surface thereof.

16. A circular exhaust manifold for radial and similar engines, said manifold having a flattened cross section, the shortest dimension of its cross section being radial, one face being adapted to fit in a depression in an airplane cowling, and the other face adapted to be substantially flush with, and forming a continuation of the cowling surface.

In testimony whereof I affix my signature.

GUISEPPE M. BELLANCA.